United States Patent [19]

Geary, Jr.

[11] 4,264,270

[45] Apr. 28, 1981

[54] ACTUATOR FOR ADJUSTABLE VANE MEANS OF A TURBOMACHINE

[75] Inventor: Carl H. Geary, Jr., Greensburg, Pa.

[73] Assignee: Carrier Corporation, Syracuse, N.Y.

[21] Appl. No.: 67,963

[22] Filed: Aug. 20, 1979

[51] Int. Cl.³ .............................................. F03B 3/18
[52] U.S. Cl. ...................................... 415/164; 74/89.2
[58] Field of Search ............... 415/164, 160, 161, 162, 415/163; 74/89.2, 96, 99 R

[56] References Cited

U.S. PATENT DOCUMENTS

| 3,730,007 | 5/1973 | Wellington | 74/89.2 |
| 3,850,043 | 11/1974 | Tarbox | 74/89.2 |

Primary Examiner—Carlton R. Croyle
Assistant Examiner—Rae Cronmiller
Attorney, Agent, or Firm—J. Raymond Curtin

[57] ABSTRACT

An actuator for adjustable vanes of a turbomachine includes a movable housing defining a chamber. A band is mounted within the chamber and affixed to the housing for movement therewith. A first roller is in engagement with the adjustable vanes and in contact with a first portion of the band. A second roller is in contact with a second portion of the band. A force generating device is connected to the housing for moving the housing and the band affixed thereto relative to said first and second rollers for rotating each of the rollers about its own axis, with rotation of the first roller resulting in corresponding movement of the adjustable vanes.

7 Claims, 4 Drawing Figures

ACTUATOR FOR ADJUSTABLE VANE MEANS OF A TURBOMACHINE

BACKGROUND OF THE INVENTION

This invention relates generally to turbomachines and in particular to an actuator for the adjustable vanes of a turbomachine.

Turbomachines, such as compressors, turbines, and expanders, utilize adjustable vanes or blades of many types. For example, adjustable vanes are employed as prewhirl devices and as antiwhirl devices. In addition, stator vanes of an axial compressor are very often adjustable as are inlet nozzle vanes.

Generally, adjustable vanes are moved in unison by actuators such as linkage arrangements connected to a movable ring which, when rotated, moves the adjustable vanes in the desired manner through the associated linkage arrangement. Actuators of the foregoing type are relatively expensive to manufacture and are subject to frictional and backlash problems. In addition, the aforedescribed actuators generally require a significant amount of maintenance to maintain such actuators trouble-free.

In the 1960's, as a result of work performed through NASA, a new relatively friction-free bearing was developed. This device is known as a "Rolamite". A Rolamite bearing is relatively frictionless, and has zero backlash. In effect, a Rolamite eliminates almost all sliding friction and generates only rolling friction. Further, the Rolamite is a relatively inexpensive and maintenance free device. Surprisingly, the Rolamite has not achieved the wide-spread and diverse use originally forecast and as would be expected, perhaps due to a general inability on the part of design engineers to comprehend the applicability of the device for diverse applications.

SUMMARY OF THE INVENTION

Accordingly, it is an object of this invention to provide an actuator for adjustable vanes of a turbomachine.

It is a further object of this invention to provide an actuator for a turbomachine which is relatively inexpensive to manufacture, is frictionless, and has almost completely zero backlash.

It is a further object of this invention to utilize a Rolamite device as an actuator for the adjustable vanes of a turbomachine.

These and other objects of the present invention are attained in an actuator for adjustable vane means of a turbomachine comprising movable housing means defining a chamber. Band means are mounted within the chamber and affixed to the housing means for movement therewith. First roller means engage the adjustable vanes and are in contact with a first portion of the band means. Second roller means are in contact with a second portion of the band means. Force generating means is connected to the housing means for moving the housing means and the band means affixed thereto relative to the first and second roller means for rotating each of the roller means about its own axis, with rotation of the first roller means resulting in corresponding movement of the adjustable vane means.

DESCRIPTION OF THE PREFERRED EMBODIMENT

Figure 1:
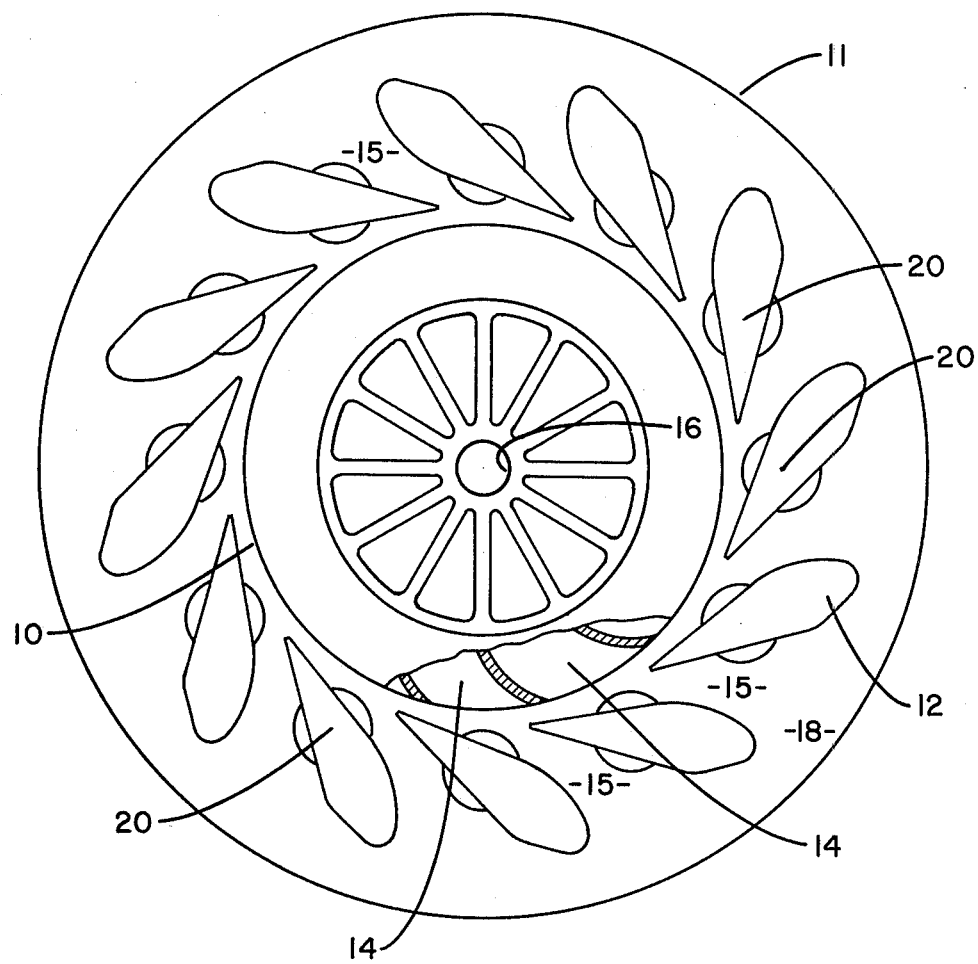
FIG. 1 is a front plan view of a portion of a turbomachine employing the present invention, with a portion of the machine being broken away to show a detail thereof.

Referring now to the various figures of the drawing, there is illustrated a preferred embodiment of the present invention. In referring to the various figures like numerals shall refer to like parts.

With particular reference to FIG. 1, there is illustrated a front view of a rotating wheel of a turbomachine such as an expander, turbine or compressor. The illustrated turbomachine is a radial inflow expander and is typical of turbomachines employing movable or adjustable vanes.

In particular, the turbomachine includes rotatable wheel 10 spaced from and rotatable relative to a stator element 11. Element 11 includes a plurality of adjustable vanes 12 mounted uniformly about the circumference thereof. Vanes 12 are designed to vary the effective flow area to wheel 10 and are located about the circumference thereof. The motivating fluid flows radially inwardly through channels 15 defined between adjacent vanes 12 into the wheel through which the fluid is expanded for generating power. Wheel 10 is suitably attached to a shaft which extends through opening 16 at the center of the wheel. Thus far, the wheel and stator elements of the illustrated turbomachine are conventional. Vanes 12 are movably connected to surface 18 of stator 11. The vanes will move in unison, with each vane rotating about its own pivot point 20 through operation of an actuating mechanism to be more fully described hereinafter.

Figure 2:
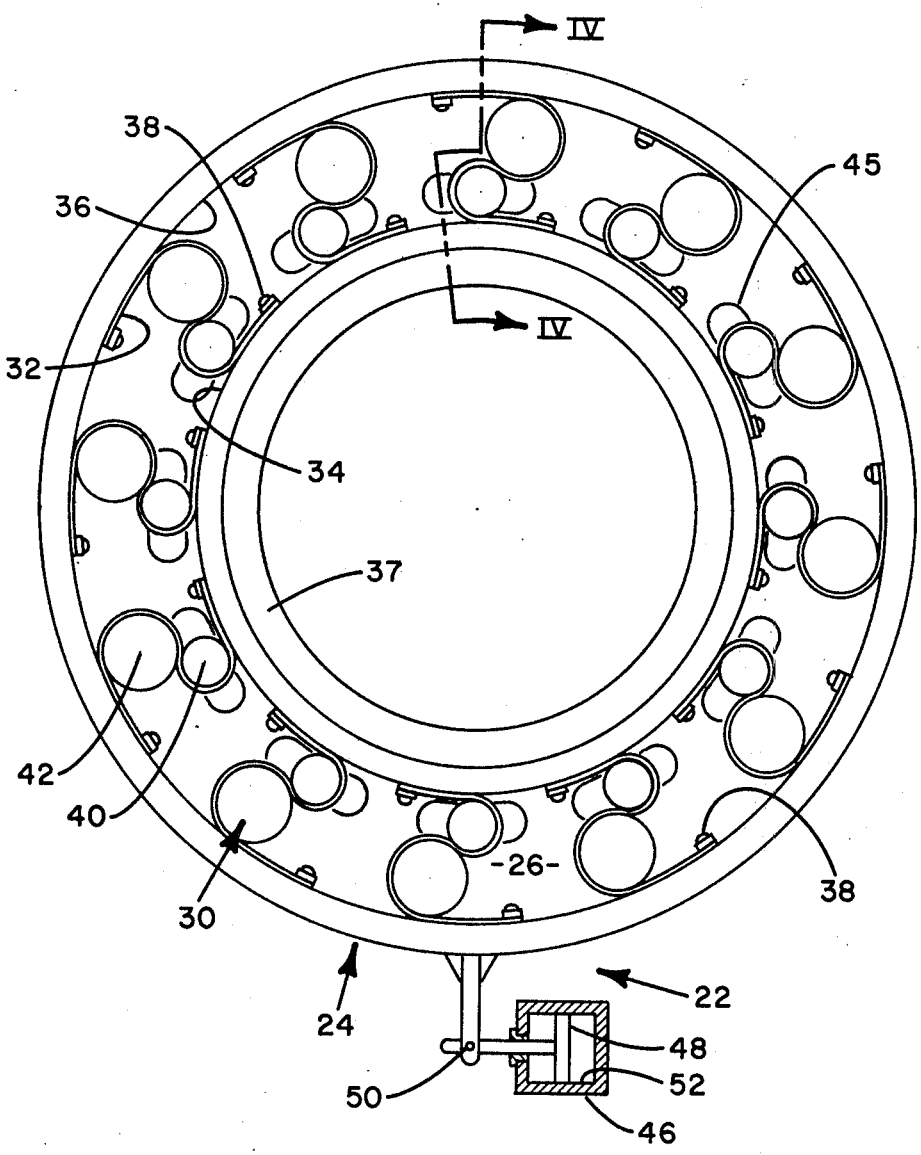
FIG. 2 is a further plan view of the rear side of the portion of the turbomachine illustrated in FIG. 1.

Referring now to FIG. 2, there is disclosed the rear of stator 11 illustrated in FIG. 1. In particular, in FIG. 2, there is disclosed a plan view of the actuating mechanism in accordance with the present invention.

Figure 4:
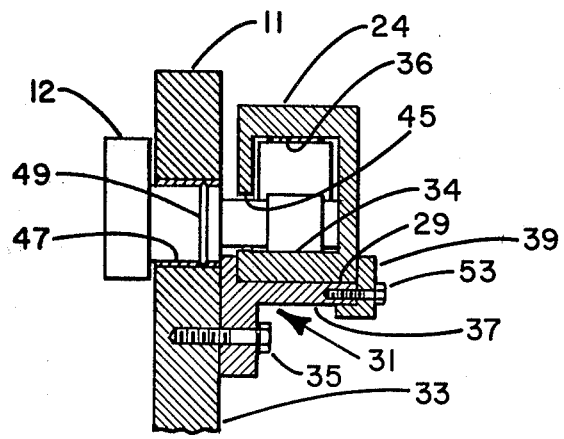
FIG. 4 is a sectional view further illustrating the detail shown in FIG. 3.

Actuating mechanism 22 includes a circumferentially extending generally rectangular shaped in cross-section member 24 forming a housing defining a chamber 26. Member 24 includes radially spaced circumferentially extending surfaces 34, 36. Member 24 is suitably contained within track 29 of channel member 31 (particularly shown in FIG. 4). Member 31 is affixed to the rear surface 33 of stator 11 by suitable means, such as cap screws 35. In particular, surface 36 is placed within track 29 of member 31 such that member 24 may rotate circumferentially relative to member 31, but cannot move axially or radially relative thereto. For ease of assembly, member 31 is defined by two separate members 37 and 39, joined together by suitable means such as screws 33. Mounted within chamber 26 are a plurality of Rolamite-type devices 30, with each Rolamite device being attached to a corresponding one of the movable vanes 12.

Figure 3:
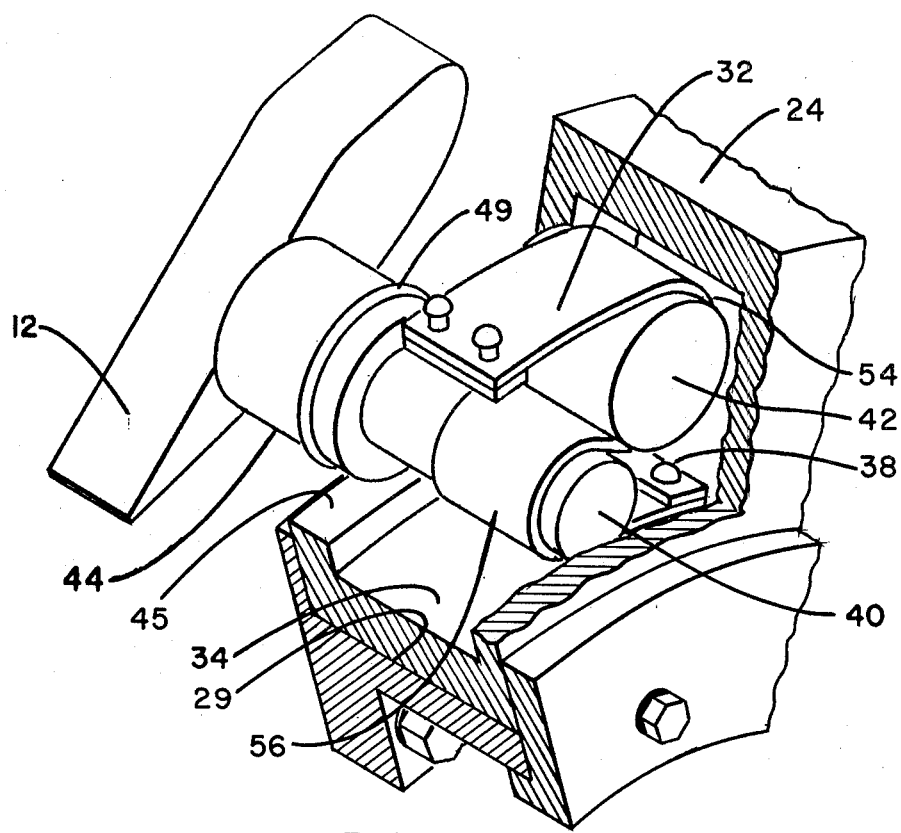
FIG. 3 is a perspective view of a detail of the present invention.

In particular, each Rolamite device 30 includes band means 32. Each end of the band means is affixed to one of the surfaces 34, 36 of housing 24. Rivets 38 or similar means are employed to affix the ends of the band means to surfaces 34, 36. Rolamite device 30 further includes a first roller member 40 and a second roller member 42. Each of the roller members are maintained in firm contact with band means 32 which is wrapped tightly around the roller means in a generally "S" or "reverse S" shaped configuration in the manner illustrated in FIGS. 2, 3 and 4. Essentially, loop 54 of band means 30 is wrapped about roller member 42 and loop 56 of the band means is wrapped about roller member 40. One of the roller means, for example roller means 40, is attached to a shaft or similar extension 44 of vanes 12 in the manner shown in FIGS. 3 and 4. Each shaft 44 extends through a slot 45 formed in member 24 and corresponding aperture 47 formed in stator 11. Shaft extension 44 includes a seal member 49 such as an O-ring to prevent leakage of the motivating fluid through apertures 47. In effect, roller means 40 forms a portion of the shaft for vane 12.

A force generating device 46 having a piston 48 is connected through link 50 to rotatable surface 36 of housing 24. Movement of piston 48 within cylinder 52 of force generating device 46 results in corresponding movement of housing 24 and thus of band means 32 affixed thereto.

In operation, when it is desired to change the effective working area of the nozzles by moving vanes 12 relative thereto, piston 48 is moved within cylinder 52 in one or the other direction depending upon whether it is desired to increase or decrease the effective working area of the nozzles. Movement of the piston results in corresponding movement of surfaces 34, 36 of housing means 24 and thus of band means 32 affixed thereto. The movement of the band means results in the band means being wrapped around roller means 40 and 42 which are maintained in a stationary or fixed position relative to the movable band means. Since the band means 32 is maintained in firm contact with roller means 40 and 42, the wrapping action of the band means causes relative rotation of roller means 40 and 42. Roller means 42 functions as an idler with respect to roller means 40. Rotation of roller 40 results, through its connection to shaft 44 of vane means 12, in corresponding movement of the vane means. Since band means 32 of each Rolamite assembly 30 is moved in unison through housing 24, there will be a corresponding uniform movement of vanes 12. Thus, an effective, relatively inexpensive, and generally frictionless actuator is provided to obtain uniform movement of vanes 12. The actuator also requires minimum maintenance to maintain same in working order when compared to the relatively complex linkage systems heretofore employed.

Although vanes 12 are illustrated as being inlet nozzle vanes for a radial inflow expander, the actuator of the present invention may also be employed with movable vanes used as prewhirl devices, antiwhirl devices and as axial stator vanes with the actuator of the present invention having applicability in each of the above described applications. Further, if desired, a variable ratio output can be obtained by varying the ratio of the radii of roller members 40 and 42.

While a preferred embodiment of the present invention has been described and illustrated, the invention should not be limited thereto but may be otherwise embodied within the scope of the following claims.

I claim:

1. An actuator for adjustable vane means of a turbomachine comprising:
    movable housing means defining a chamber;
    band means mounted within said chamber and affixed to said housing means for movement therewith;
    first roller means engaging said adjustable vane means and in contact with a first portion of said band means;
    second roller means in contact with a second portion of said band means; and
    force generating means connected to said housing means for moving said housing means and said band means affixed thereto relative to said first and second roller means for rotating each roller means about its own axis, with rotation of said first roller means resulting in corresponding movement of said adjustable vane means.

2. An actuator in accordance with claim 1 wherein said housing means comprises a generally circumferentially extending, generally rectangular in cross-section member, formed by a pair of radially spaced circumferentially extending surfaces.

3. An actuator in accordance with claim 2 wherein one end of said band means is affixed to the inner surface of one surface of said generally rectangular shaped member, the other end of said band means being affixed to the inner surface of the other surface of said generally rectangular shaped member.

4. An actuator in accordance with claims 1 or 3 wherein said adjustable vanes define variable area nozzles.

5. An actuator in accordance with claims 1 or 4 wherein said first roller means is defined by shaft means attached to and rotatable with said vane means.

6. An actuator in accordance with claim 1 wherein said band means is defined by a member having a generally S-shaped configuration.

7. An actuator for adjustable vane means of a turbomachine having at least one stator element comprising:
    a housing including a pair of generally radially spaced circumferentially extending surfaces defining therebetween a chamber;
    means connecting said surfaces to said stator element for permitting movement of said surfaces relative to said stator element;
    band means mounted within said chamber and having one end affixed to a first surface of said housing of said and a second end affixed to the other surface portion of the housing;
    first roller means mounted within said chamber and engaging said adjustable vane means and contacting a first portion of said band means;
    second roller means mounted within said chamber and contacting a second portion of said band means, said band means being movable relative to said first and second roller means; and
    force generating means connected to said housing for moving said housing and band means affixed thereto relative to said first and second roller means for rotating each roller means about its own axis, with rotation of said first roller means resulting in corresponding movement of said adjustable vane means.

* * * * *